Nov. 10, 1970     L. TOURMEN     3,538,710

BREAKWATER STRUCTURE

Filed April 7, 1969     3 Sheets-Sheet 1

INVENTOR
LOUIS TOURMEN
BY
John J. Hart
ATTORNEY

INVENTOR.
LOUIS TOURMEN

United States Patent Office 3,538,710
Patented Nov. 10, 1970

3,538,710
BREAKWATER STRUCTURE
Louis Tourmen, Grenoble, France, assignor to Societe Grenobloise d'Etudes et d'Applications Hydrauliques, Grenoble, France, a corporation of France
Continuation-in-part of application Ser. No. 630,873, Apr. 14, 1967. This application Apr. 7, 1969, Ser. No. 822,818
Claims priority, application France, Apr. 16, 1966, 4,920
Int. Cl. E02b 3/04, 3/14
U.S. Cl. 61—4                                19 Claims

ABSTRACT OF THE DISCLOSURE

A breakwater composed of two vertical, spaced parallel walls exposed to wave attack and forming therebetween a drain basin capable of holding back water from each incoming wave, and the landward wall being higher than the seaward wall. The landward wall is preferably curved seawardly to function as a wave deflector.

---

This application is a continuation-in-part of my application Ser. No. 630,873, filed Apr. 14, 1967.

As is known to the art, when a rubble mount breakwater, or a vertical faced dike, or a pitched embankment faced with stone protecting a seashore, or a river bank, or other similar works, are subjected to the attack of heavy waves, they are eventually overtopped by waves that exceed a certain limit. Overtopping by waves is almost always undesirable because such waves usually possess horizontal thrust forces of magnitudes that are capable of impairing structural stability and therefore of endangering the actual structure, or causing damage in the protected area behind the structure. In an attempt to avoid this, it has been found necessary to strengthen the protection works to take care of overtopping and this materially increases the cost of such structures.

Overtopping by waves can be prevented, or at least reduced, by making the crest of the structure sufficiently high enough, but this solution also usually results in a considerable increase in the cost of the structure. This is especially the case when the builder takes into consideration the factor that the horizontal forces of the waves acting on the structure will increase with the latter's height.

It is the primary purpose of the present invention to provide an improved breakwater having a crest or top level which is within acceptable limits of height commensurate with cost, and yet which is capable of preventing overtopping by incoming waves.

Another object of this invention is to provide an improved breakwater which is capable of converting the horizontal forces of the waves into near-vertical forces that are more readily absorbed by the structure without damage thereto.

In accordance with the aforesaid objects, the invention provides a breakwater structure composed of two parallel walls spaced apart so as to form therebetween, a basin capable of holding water back from such incoming wave. The basin is provided with drain openings through which the trapped water is able to empty out, either partially or completely. The rear wall is higher than the front wall and in cooperation with the front wall modifies the horizontal forces of the incoming waves. It is preferred that the upper frontal surface portion of the rear wall be curved upwardly and outwardly to seaward so that it functions as a deflector and throws the water back over the front wall and into the sea.

A better understanding of the invention as well as the advantages and features of novelty thereof will be obtained from a perusal of the following description, when read in connection with the accompanying drawings which show by way of example a variety of the types of structures in which the invention may be utilized, and in which FIG. 1 is a diagrammatic sectional elevation of a vertical dike embodying the invention and with the transverse walls omitted in order to better illustrate the wave action;

Figure 1:
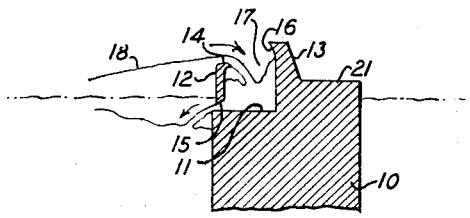
Figure 2:
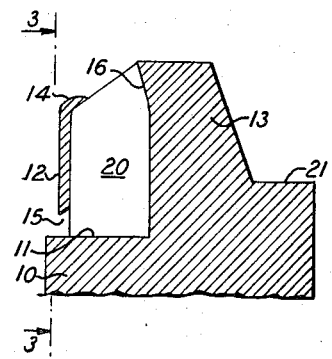
FIG. 2 is a view similar to FIG. 1 but showing the manner in which the transverse walls are embodied in the structure.
Figure 3:
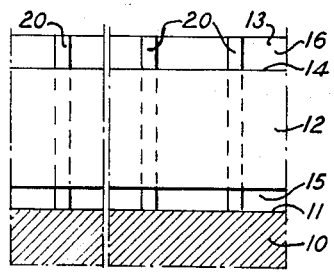
FIG. 3 is a partial side elevational view of the structure shown in FIG. 2.

Referring more particularly to FIGS. 1–3 of the drawings, the numeral 10 indicates generally the top portion of a vertical dike provided on its top with a breakwater structure made in accordance with this invention. Such breakwater is composed of two walls 12 and 13 which extend lengthwise of the dike in substantially parallel relation to the longitudinal centerline of the dike. Wall 13 is located substantially centrally of the dike and extends along one side of a platform or ledge 11 forming the top surface of the dike on the seaward side of the wall 13. The wall 12 overlies the outer edge portion of the platform 11 and is spaced therefrom to provide a drain opening 15 extending the length of the platform 11. The wall 12 extends vertically upwardly to a point short of the height of the wall 13. It will thus be seen that on the seaward side of the dike 10, the platform 11 and the walls 12, 13 form a longitudinally extending basin 17 for entrapping water from each incoming wave and from which the entrapped water is drained back into the sea through the drain opening 15. The wall 12 is supported in spaced relation to the platform 11 and to the wall 13 by a plurality of transverse partitions 20 which are mounted on the platform 11 and extend vertically upwardly between the walls 12 and 13. The partitions 20 are in engagement with the walls 12 and 13 throughout their heights so that they not only support the wall 12, but rigidify and brace both walls against the horizontal forces of the waves. It will be noted also that wall 13 is materially heavier or thicker than wall 12 and is integrally formed with the top 10 of the dike. On the landward side of wall 13, a ledge 21 that is higher than the ledge 11 forms the remaining top surface of the dike; the landward side surface of wall 13 preferably slanting downwardly toward such ledge 21.

The seaward side surface of wall 13 is vertical for the major portion of its height. At its upper or top portion designated 16, the seaward side surface of wall 13 curves upwardly and outwardly seawardly so as to deflect incoming waves 18 into the basin 17. The top portion 14 of the wall 12 projects inwardly and its top surface is curved downwardly and inwardly to direct the water from such incoming waves into the basin 17.

It will be understood from the aforesaid description of the embodiment shown in FIGS. 1–3 of the drawings, that high waves 18 in FIG. 1, coming in from the open sea break over the wall 12 and spill into the basin 17 where they set up the eddy motion shown in such figure. This direction of the waves into the basin is accomplished by the difference in the height and space setting of the two walls 12 and 13 and by the configurations of their upper portions 14 and 16, respectively. As a result of such action, part of the horizontal forces in the waves are converted into vertical forces and the consequent eddy motion that is set up acts to dissipate the energy of the waves in the basin. In the case of more powerful waves, some of the water spilling into the basin tends to rise up the wall 13 and be deflected back into the sea by the curved upper portion 16 of such wall. Unusually large waves that might break over the wall 13, will by the aforesaid action of the walls and basin have their forces so undermined and counteracted as to be rendered practically harmless and will merely spill down over the landward side of the wall 13 and onto the shelf 21 without causing damage. When a wave recedes and in the period between waves, the water in the basin runs back into the sea through the drain opening 15. The sizes of the basin and the opening are such that the basin 17 will be practically emptied by the time the next wave arrives. It will be understood that the distance between the two walls 12 and 13, the height setting of such walls and the particular configurations which their upper portions will be given, the basin bottom level, and the size of the drain opening, should be properly designed in accordance with the usual practices known to those skilled in the art and if necessary with the aid of scale model tests as is usual, to ensure the suitability of a structure of this invention for particular local conditions and its intended purpose. The design of of the basin and its drain opening, should take into consideration whether the bottom of the basin and the drain opening is to be above or below sea level at the particular site for the structure, should ensure that the basin empties out under the requisite conditions of such site, and should ensure that the ingress of water through the drain opening of the structure will be held to a minimum when the incoming waves rise up on the structure.

FIGS. 4 to 10 show how the two walls and basin formed therebetween may be modified to adapt them to different situations, and in the structures of such figures those parts thereof which are similar to the parts in the structure shown in FIGS. 1–3 have been given the same reference numerals that designate the latter.

Figure 4:
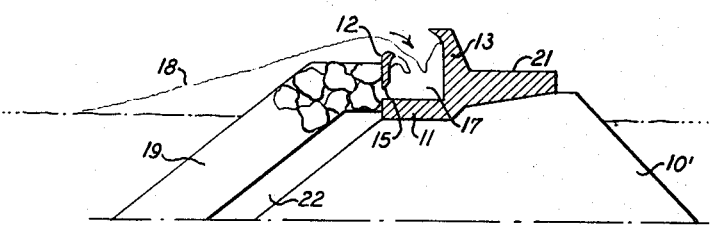
FIG. 4 is a diagrammatic sectional elevation illustrating the manner in which the invention may be utilized in a rubble mound breakwater.

FIG. 4 shows a rubble mound breakwater 10' provided with a protective facing 19 composed of blocks or large stones laid pell mell on a stone pitching 22 covering the seaward side of the rubble mound. The structure of this invention composed of the shelf or platform 11, walls 12 and 13, and the shelf or platform 21 is cast as one integral piece in concrete or the like and positioned on top of the rubble mound with the outer edge of the shelf 11 abutting the upper edge of the pitching 22. The block facing 19 is built up so that it covers the drain opening 15 and extends up a major portion of the exterior surface of the outer wall 12. Thus, in this construction, the drain opening discharges into the upper portion of the facing 19 which forms part of the outer wall and which is sufficiently permeable to permit the water to get away from the basin 17.

Figure 5:
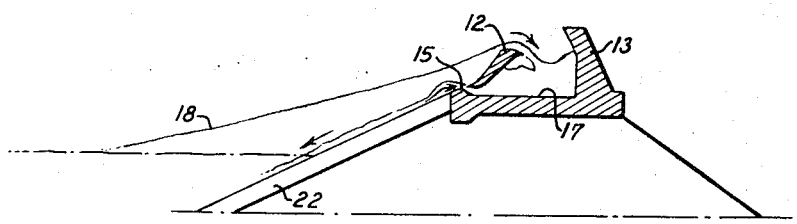
FIG. 5 is a view similar to FIG. 4 showing the invention applied to a protective stone pitching on a river bank.

In the construction of FIG. 5, the protective block facing has been eliminated so that water draining out of the basin 17 will run down along the stone pitching 22. Thus, the water from a previous wave will, as it drains down the pitching 22, exert a braking action on the next arriving wave and undermine it to some extent before it reaches the breakwater structure at the top of the mound. As indicated in FIG. 4 the outer wall 12 may be designed so that a relatively strong flow of water will result as the basin drains so as to exert a correspondingly stronger braking action on the next incoming wave.

Figure 6:
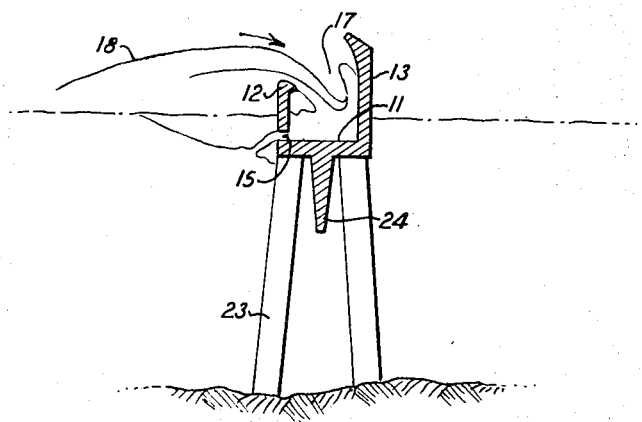
FIGS. 6 and 7 are views similar to FIG. 4 and illustrate how the structure of this invention may be provided on a pier formed of piles, and on a floating breakwater, respectively.

FIG. 6 of the drawings, illustrates how the structure of this invention may be supported on piles 23 driven into the floor of the sea. This embodiment may also be cast as an integral unit of concrete, but can be constructed of other suitable materials. As illustrated, it need not be provided with a second platform 21 as in the structures of FIGS. 1–4. The wall 13 is such embodiment therefore may be made vertical so that the structure has a generally channel-like configuration. It will be noted also that in this structure which is particularly advantageous in deep water, the drain opening 15 is below sea level. A longitudinally extending downwardly projecting wave barrier 24 may be provided centrally of the platform or base 11 of the basin 17 to keep the wave motion passing from one side of the structure to the other within acceptable limits.

Figure 7:
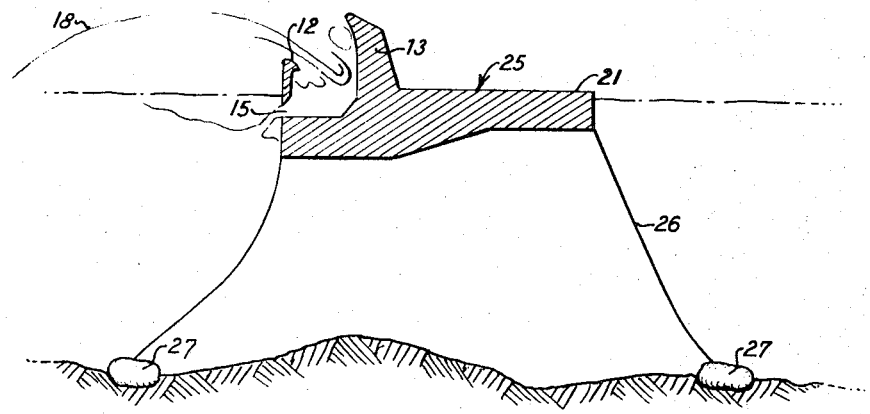

FIG. 7 of the drawings shows how the invention may be adapted to a floating breakwater 25 that may be secured to the sea bed by cables 26 and deadweight sinkers 27. It is preferred in this construction that the platform 21 be made substantially wider than those of the embodiments shown in FIGS. 1–4 in order to give the structure greater stability.

Figure 8:
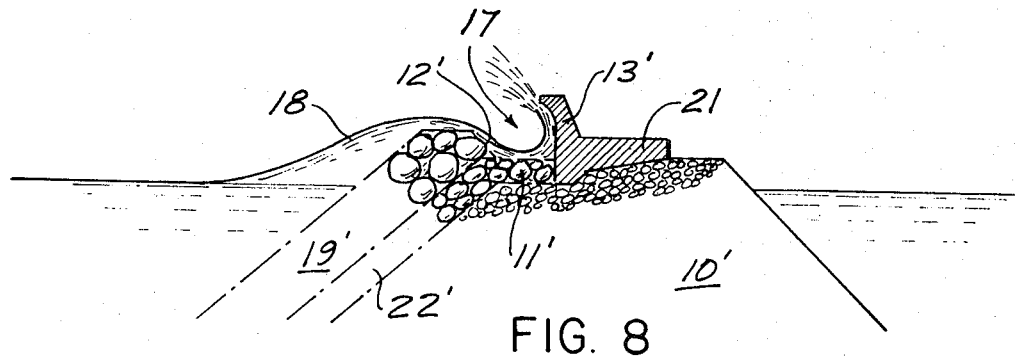
FIGS. 8 and 9 are also views similar to FIG. 4 and show modifications of the type of structure shown in such latter figure.
Figure 9:
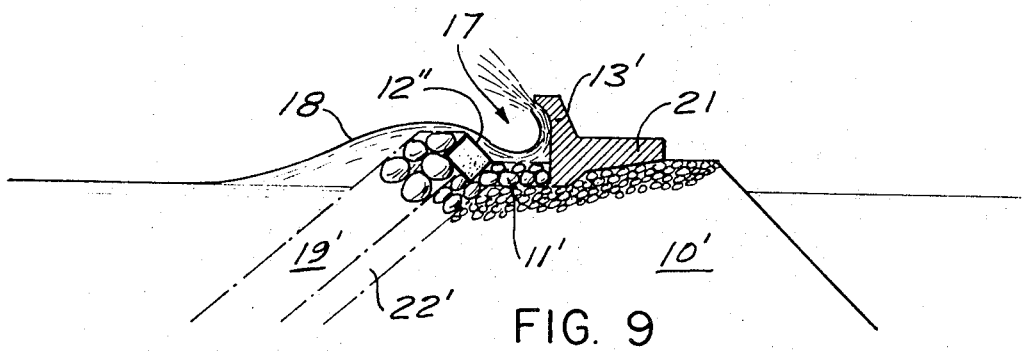
Figure 10:
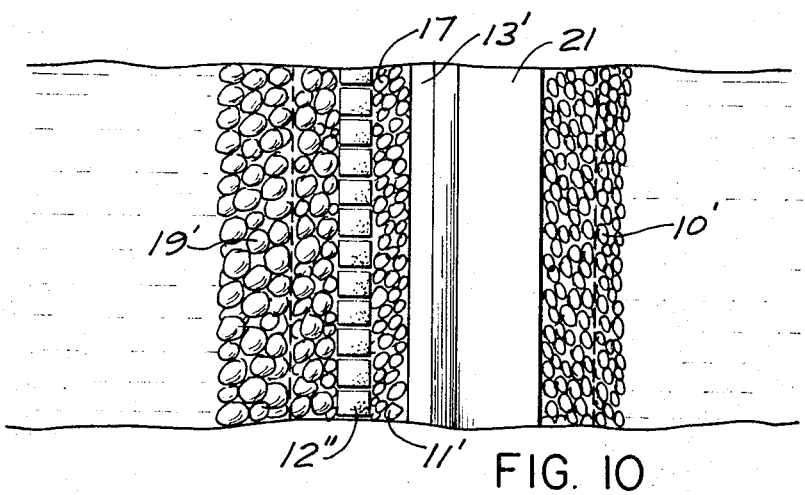
FIG. 10 is a top plan view of the structure shown in FIG. 9.

FIGS. 8–10 of the drawings show two modifications of the embodiment of FIG. 4. These two modifications differ from the structure of FIG. 4 in that, in each of them, the platform 11 and the foremost or seaward wall 12 in the structure of FIG. 4 are not cast integrally with the landward wall 13'. Instead the upper end of the layer of stone pitching 22' is extended in these two modifications to form the bottom wall 11' of the basin 17. The upper end of the protective facing 19' composed of blocks or large stones laid pell mell on the stone pitching 22', as in the structure of FIG. 4, also forms in these two modifications the basic foremost or seaward wall of the structure. The inner facing of such seaward wall is inclined and constituted of a layer 12' of concrete in the modification of FIG. 8, or a row 12" of aligned concrete parallelepiped blocks in the modification shown in FIGS. 9 and 10. The layer 12' of concrete forming the inner facing in FIG. 8 may be a continuous one, or it may be constituted of an aligned series of spaced, rectangularly-shaped elements in the manner of the row of blocks 12" in the embodiment of FIGS. 9 and 10. It will be understood that in both of these constructions the water trapped in the basins 17 will drain out through the spaces between the stones of the pitching 22' and the protective facing 19'.

It will be understood that the examples herein described and illustrated in the drawings are given to indicate the adaptableness of the invention to a variety of situations, and that it is contemplated that additional changes and modifications thereof may be made without departing from the spirit of the invention or the scope of the appended claims.

What is claimed is:

1. A breakwater comprising a horizontal platform located between two elongated, longitudinally extending upright walls disposed in spaced substantially parallel relation and forming with said walls an elongated basin extending across the path of waves on a body of water and capable of holding back water from each incoming wave, the top of the wall foremost to such waves being lower than the top of the other wall so that the incoming waves spill over such foremost wall and into said basin, said foremost wall being provided with an opening at its base enabling water trapped in such basin from a preceding wave to drain back into the body of water before the arrival of the following wave.

2. A breakwater as defined in claim 1, in which said foremost wall is elevated from said platform to provide an elongated drainage opening at the base of such wall, and means for supporting said foremost wall in elevated position.

3. A breakwater as defined in claim 2, in which said supporting means comprises a plurality of spaced transverse members mounted on said platform between said walls and bracing both of said walls against the horizontal wave forces.

4. A breakwater as defined in claim 1, in which the upper end of said foremost wall is contoured to direct the water of incoming waves into said basin.

5. A breakwater as defined in claim 1, in which the top portion of said other higher wall is contoured to deflect wave water rising in said basin back over said foremost wall and toward the body of water.

6. A breakwater as defined in claim 1, including a second platform extending along the other side of said other higher wall so that said latter wall is located between said platforms, said second platform being higher than said first mentioned platform.

7. A breakwater as defined in claim 1, in which said platform is located above the level of said body of water, and including a water permeable layer of material extending from said body of water to said foremost wall and covering said drainage opening, the water discharging from said basin and through said opening into the upper portion of said water permeable layer.

8. A breakwater as defined in claim 1, in which said platform is located above the level of said body of water, and including an inclined surface extending from said drainage opening to said body of water to enable water from a previous wave draining from said basin and flowing down said inclined surface, to exert a braking action on an incoming following wave.

9. A breakwater as defined in claim 1, in which said platform is exposed underneath to the body of water, and including a vertically disposed partition depending downwardly from said platform for controlling wave motion in the portion of the body of water beneath said platform.

10. A breakwater structure having an elongated top platform-like surface located above the troughs of the waves on a body of water and extending across the path of the waves on such body of water with its front longitudinal edge located on the seaward side thereof, a first wall extending longitudinally of said structure above the front longitudinal edge portion of said top surface and an elongated opening at the base of said first wall permitting the passage of water therethrough, and a second wall extending longitudinally of said structure in spaced relation to and in rear of said first wall to form with said first wall and said top surface an elongated basin extending longitudinally of said structure at the top thereof and in communication with said elongated opening to enable water trapped in such basin from a wave to drain back into the body of water before the arrival of a following wave, said second wall having a deflecting surface other than vertical and facing said first wall for throwing back wave water.

11. A breakwater structure as defined in claim 10, in which said first wall is elevated from such front edge portion of said top surface so that said elongated opening is formed between such top surface and the bottom longitudinal edge of said first wall, and means for supporting said first wall in elevated position.

12. A breakwater structure as defined in claim 11, in which said supporting means comprises a longitudinally aligned series of spaced transverse members mounted on said top surface.

13. A breakwater structure comprising an elongated breakwater base extending across the path of the waves on a body of water and having provided on the top thereof a first wall extending longitudinally of said breakwater base on the seaward side thereof, a second wall extending longitudinally of said breakwater base in spaced relation to and in rear of said first wall, and a floor between said walls, said floor and the portions of said walls above said floor being located above the troughs of the waves in said body of water and forming an elongated basin extending longitudinally of said structure at the top thereof above such wave troughs, said second wall having a deflecting surface other than vertical facing said first wall for throwing back wave water, and means to enable water from a wave trapped in said basin to drain back into the body of water before the arrival of a following wave.

14. A breakwater structure as defined in claim 13, in which said drainage means comprises water permeable material on the seaward side of said breakwater base and having drainage water passages therein communicating with said elongated basin and of sufficient combined area to effectively drain wave water trapped in said basin before the arrival of a following wave.

15. A breakwater structure as defined in claim 14, in which said water permeable material is composed of an inner base layer of stone pitching laid on said base, and an outer layer of blocks laid pell-mell on said inner layer, the upper portion of one of said layers forming a water permeable surface portion in the bottom part of said elongated basin.

16. A breakwater structure as defined in claim 14, in which said water permeable material is composed of a layer of stone laid on said base and forming the bottom wall of said basin.

17. A breakwater structure as defined in claim 14, in which said water permeable material is composed of a layer of stone laid on said base and shaped at its upper end to form said first seaward wall.

18. A breakwater structure as defined in claim 17, in which the inner facing of said first wall forming the seaward side of said basin is lined with concrete.

19. A breakwater structure as defined in claim 18, in which said lining is composed of a series of aligned concrete blocks.

References Cited

UNITED STATES PATENTS

| | | | |
|---|---|---|---|
| 857,506 | 6/1907 | Wieland | 61—4 |
| 1,423,884 | 7/1922 | Rush | 61—49 |
| 3,096,621 | 7/1963 | Danel | 61—4 |
| 3,118,282 | 1/1964 | Jarlan | 61—4 |

FOREIGN PATENTS

| | | |
|---|---|---|
| 47,372 | 7/1909 | Switzerland. |
| 707,767 | 4/1931 | France. |
| 915,057 | 1/1963 | Great Britain. |

PETER M. CAUN, Primary Examiner

U.S. Cl. X.R.

61—49